(12) United States Patent
Goldman et al.

(10) Patent No.: US 6,854,845 B1
(45) Date of Patent: Feb. 15, 2005

(54) EYEGLASSES WITH RETENTION CLIP

(75) Inventors: Donna Goldman, 11 Olive Ave., Ross, CA (US) 94957; Arturo Meuniot, San Francisco, CA (US)

(73) Assignee: Donna Goldman, Ross, CA (US); by said Arturo Meuniot ( * ) Notice: Subject to any disclaimer, the term of this patent is extended or adjusted under 35 U.S.C. 154(b) by 0 days.

(21) Appl. No.: 10/775,008

(22) Filed: Feb. 9, 2004

Related U.S. Application Data (60) Provisional application No. 60/445,564, filed on Feb. 7, 2003.

(51) Int. Cl.$^7$ .................................................. G02C 5/14
(52) U.S. Cl. ...................................... 351/112; 351/121
(58) Field of Search ................................ 351/111, 112, 351/121; 24/3.3

(56) References Cited

U.S. PATENT DOCUMENTS

| | | | |
|---|---|---|---|
| 1,779,015 A | 10/1930 | Schmitt | 351/112 |
| 1,898,059 A | 2/1933 | McDonald | 24/3.5 |
| 3,210,814 A | * 10/1965 | Wolf | 24/3.5 |
| 4,316,654 A | 2/1982 | Allen | 351/155 |
| 4,496,224 A | 1/1985 | Allen | 351/155 |
| 4,903,375 A | 2/1990 | DiFranco | 24/3.3 |
| 5,235,727 A | 8/1993 | McCloskey | 24/3.3 |
| 5,414,906 A | 5/1995 | Kren | 24/3.3 |
| 6,059,410 A | * 5/2000 | Wang | 351/112 |

* cited by examiner

*Primary Examiner*—Huy Mai
(74) *Attorney, Agent, or Firm*—Thomas M. Freiburger (57) ABSTRACT

A retention device for eyeglasses includes a swingable clip lever pivoted essentially on the same pivot with one of the temples of the eyeglasses. A mechanical linkage causes the clip lever to lie closely alongside the temple when the temple is fully closed and when the temple is fully opened, but to swing away from the temple in intermediate positions, thus enabling the clip to be engaged over an edge of clothing or other material to retain the eyeglasses in place when not being worn by a person. Preferably an over-center device is included to firmly retain the temple in the closed position until deliberately opened.

11 Claims, 11 Drawing Sheets

EYEGLASSES WITH RETENTION CLIP

This application claims benefit of provisional application No. 60/445,564, filed Feb. 7, 2003.

BACKGROUND OF THE INVENTION

The invention relates to means for temporarily securing eyeglasses and other eyewear when not being worn.

For those who use eyeglasses, sunglasses, safety glasses or other eye coverings having temples ("eyewear" or "eyeglasses"), it is sometimes necessary to remove the eyewear and temporarily secure, hold or stow it within reach but in a way that allows the continued use of both hands. Common methods of doing so include folding the eyeglasses and suspending them from one temple (the pieces extending from the sides of each lens to behind each ear) over a shirt collar, the placket of a buttoned shirt, a pocket patch, a belt or the end of another vertical surface. Unfortunately, this means of stowage is not secure, and the eyewear can easily fall, resulting in damage or loss. Many designs have made attempts at improving the security of such temporary storage. Some modify the temple or attach a clip to the temple at the time of eyewear manufacture. Others attach a clip or similar feature following purchase of the eyewear. These involve an additional hinge, are cumbersome to mount, negatively affect the appearance and attractiveness of the eyewear, are easily separated and lost from the eyewear, don't work, require special materials to tolerate stress as a spring clip, require special dexterity on the part of the user to open or close, are suitable for only a limited portion of the existing range of eyewear, or can otherwise result in inconvenience, damage to property, or personal injury in use.

Prior art patents include U.S. Pat. No. 1,779,015 (Schmitt), that utilizes temple clips either molded as one piece with the temple bar or attached by rivet or clamp to the temple bar. U.S. Pat. No. 1,898,059 (McDonald) utilizes a temple clip attached by split-barrel clamp and retained with a set screw. Retrofit clips for eyewear temples include U.S. Pat. No. 4,903,375 (DiFranco) that uses a plastic clip to attach to a variety of temple pieces through the use of two "O" rings. U.S. Pat. No. 5,235,727 (McCloskey) provides several embodiments of an attachable pocket clip made of an elastically deformable material, such as a U-shaped spring steel clasp. Like DiFranco '375, the device of McCloskey '727 is not a rigid attachment, and its U-shaped embodiment does not provide a secure fit. Different designs are used for different temple piece cross sections.

U.S. Pat. Nos. 4,316,654 and 4,496,224, (Allen), relate to eyeglass frames where the frames themselves are manufactured with pocket clips attached to the rims of eyeglass lenses. U.S. Pat. No. 5,414,906 (Kren) involves an eyeglass storage clip attached to a temple piece with a dual barrel design. It consists of several parts and uses spring clips to attach to a garment or pocket.

The disadvantages of the prior art are (1) that temple bar clips add a third or third and fourth hinge and hence add difficulty and expense to manufacture and assembly (as in Schmitt '075, McDonald '059, Allen '654, Allen '224 or Kren '906), and (2) that the retrofit configurations of DiFranco '375, McCloskey '727, and others include not only the disadvantages of (1) but they are not elegant, stylish, applicable to a significant portion of the eyewear available, or strong enough to last as long as the eyeglasses.

A principal object of the present invention is to provide a means of temporarily securing eyewear utilizing essentially the existing temple-to-frame hinge axis, does not require special elastically deformable materials to tolerate the repeated stresses and strains of being forced onto and off the object to which the eyewear is being temporarily attached, does not require unusual dexterity to open or close, does not interfere with the more permanent storage of the eyeglasses, does not project in a manner that could result in injury to persons or damage clothing or other articles in use, and does not significantly add to the cost or complexity of manufacture, assembly, packaging or distribution.

SUMMARY OF THE INVENTION

The invention utilizes the axis of the hinge (or an axis close to that axis) that connects the lens holding frame of eyeglasses to the temples as the pivot for a clasp or clip lever that is normally closed, and can (when desired) be opened and then clasped securely with one hand onto any accessible thin object or surface (e.g., a shirt pocket, belt, coat collar, purse strap, etc.). Similarly, when it is desired to release it, the clasp's retention force is easily released with one hand, and the eyeglasses can easily be removed from the object or surface to which they were temporarily attached.

In one embodiment of the invention a pair of eyeglasses includes a clip lever essentially pivotally connected to the hinge fitting at one side of the lens holding frame of the eyeglasses, positioned to lie closely adjacent to the temple at the one side when the temple is fully opened and also when the temple is fully closed. A linkage means responsive to pivotal movement of the temple between the opened position for wearing of the eyeglasses and the closed position folded adjacent to the lens holding frame, holds the clip lever closely adjacent to and substantially against the inner side of the temple in both the opened and closed positions of the temple, and holds the clip lever spaced angularly away from the temple in positions of the temple between opened and closed. In these intermediate positions the clip lever is spaced away from the temple sufficiently to engage an edge of clothing or other material between the temple and the clip lever. When the eyeglass temple is then fully closed, the clip securely pinches the edge of clothing or other material against the temple to retain the eyeglasses securely in place.

In one principal embodiment the linkage means includes a shuttle slidable along the temple toward and away from the hinge fitting, the shuttle being caused to slide by a first pivot link connected to the shuttle and to the hinge fitting that draws the shuttle toward the hinge fitting as the temple approaches fully opened position and as the temple approaches closed position and extends the shuttle away from the hinge fitting in intermediate positions. The shuttle is connected to the clip lever by a second pivot link which, due to the sliding motion of the shuttle, draws the clip lever toward the temple as the temple reaches the closed position and also as the temple reaches the open position, while swinging the clip lever away from the temple in intermediate positions.

In a preferred embodiment a bump or protrusion is included near the pivoted end of the clip lever, on the clip lever or on the hinge fitting adjacent to the clip lever, to slightly interfere with full pivoting of the clip lever and, by mechanical connection, with the temple. This provides an over-center effect, requiring additional force to fully close the temple and, when fully closed, retaining the temple in the closed position with the clip lever against the temple. A deliberate force is required to open the temple so that the glasses will be held tightly to an object even when the person leans over, runs, jumps, etc.

In another embodiment the linkage means again includes a shuttle, but the position of the sliding shuttle is shifted not by a connector link, but camming action, with a spring biasing the shuttle toward the hinge fitting of the eyeglasses. The hinge fitting has a cam surface positioned to engage with an end of the shuttle to cam the shuttle to slide away from the hinge fitting as the temple swings through intermediate positions between opened and closed while allowing the shuttle to slide toward and adjacent to the hinge fitting as the temple approaches closed position and also opened position. The shuttle is connected to the clip lever by a shuttle pivot link. Due to the sliding motion of the shuttle, this shuttle pivot link draws the clip lever toward the temple as the temple reaches the closed position and also as the temple reaches the opened position, while swinging the clip lever away from the temple in intermediate positions. In one specific form of the invention the shuttle is the temple, itself, sliding on a slide support member pivoted at the hinge fitting.

A further embodiment includes a link connector between the temple and the clip lever, without a shuttle, and with the clip lever and temple pivoted to the hinge fitting at separate but adjacent pivot axes. The pivot axes at the hinge fitting and on the link connector are so arranged as to hold the clip lever against the temple in the fully opened and fully closed positions, but to space the clip lever away from the temple by a short distance at intermediate positions.

The above and other objects, advantages and features of the invention will be apparent from the following description of preferred embodiments, considered along with the accompanying drawings.

DESCRIPTION OF PREFERRED EMBODIMENTS

The invention is operated by movement of the temple through its 90° of rotational movement about the temple-to-lens frame hinge axis. For ease of discussion, the operation of the invention will be described with respect to the right hand temple of a pair of eyeglasses; the mechanism of the invention can be constructed and operated on either (or both) temples.

Figure 1:
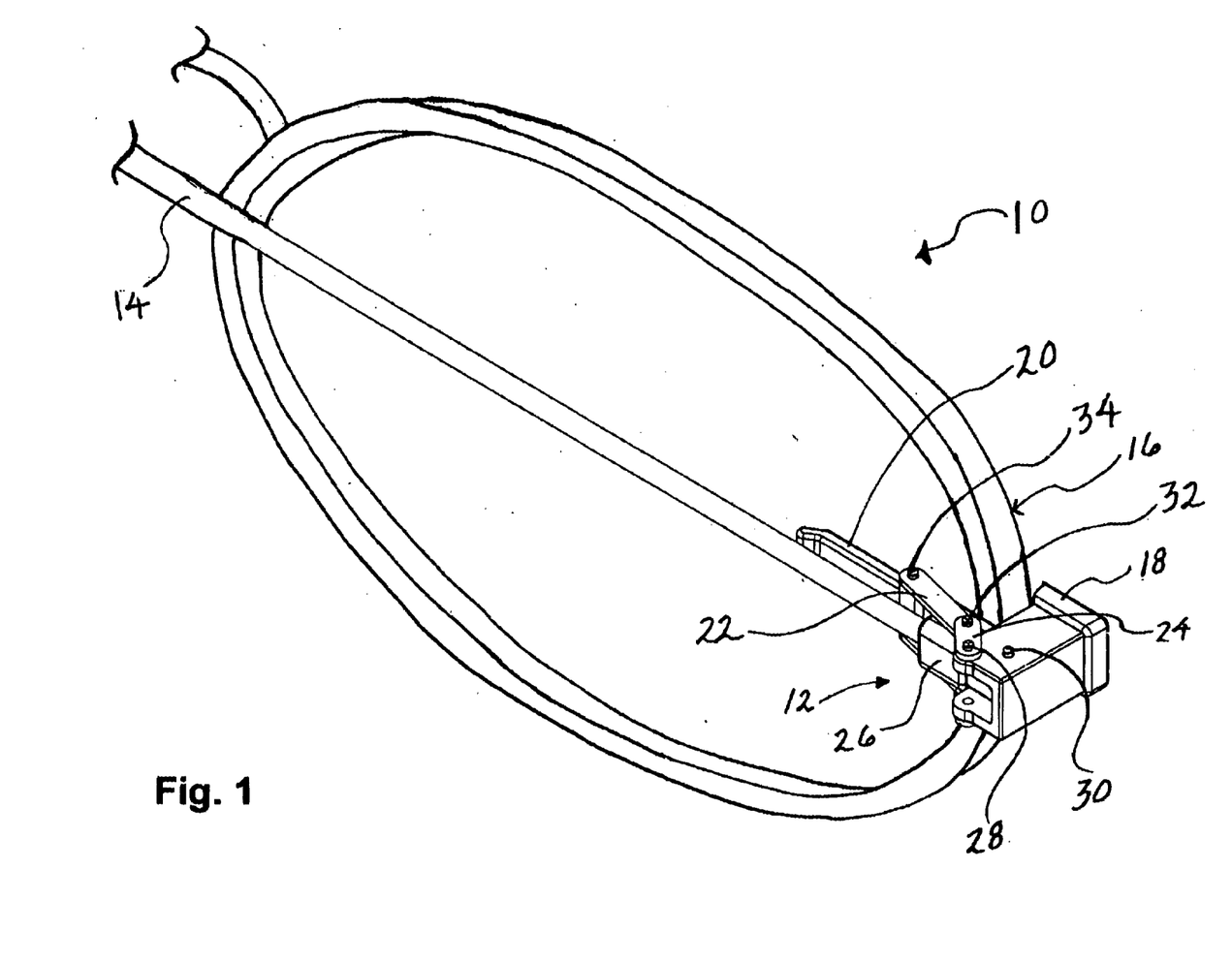
FIG. 1 is a perspective view showing a first embodiment of the invention, with the temple on a pair of eyeglasses fully closed.

FIG. 1 shows relevant portions of a pair of eyeglasses 10 having the improvement of the invention. In this embodiment a mechanism identified as 12 is connected to the right temple 14 (although it could be on the left temple) and to the lens holding frame 16, via a hinge fitting 18 secured to the lens frame. By this mechanism, a clasp or clip lever 20 is engaged against the temple 14 when the temple is fully closed and also when it is fully opened, but is spaced away from the temple in intermediate positions, as can be seen from FIGS. 1–4C. This mechanism includes first and second connector links 22 and 24, and a shuttle 26 which is slidable along the temple 14, away from and toward the hinge fitting 18.

Figure 2:
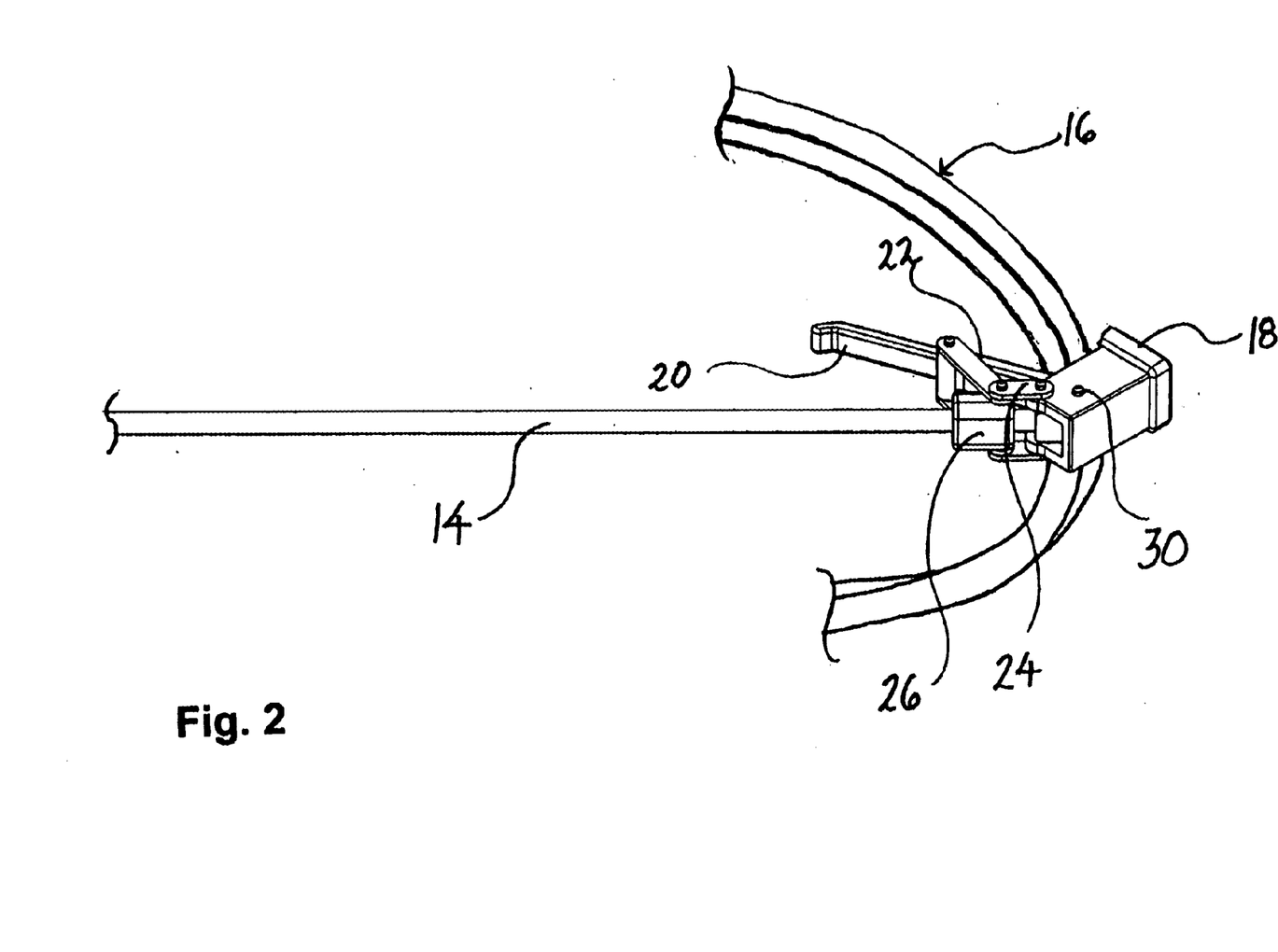
FIG. 2 is a perspective view showing a portion of the apparatus of FIG. 1, with the temple partially opened.

In FIG. 1 the temple 14 is fully closed against the lens frame 16. The first and second pivot links 22 and 24 are in the positions shown in FIGS. 1 and 4A. The position of the shuttle 26 is controlled by the pivot link 24 (of which there may be two, one at top and one at bottom). The second pivot link 24 is pivotally secured to the hinge fitting 18 at a pivot axis 28 which is spaced away from the main pivot axis 30 of the temple and of the clip lever 20, in the direction shown. The other end of the second pivot link 24 is pivotally connected to the shuttle 26, at a pivot axis 32. When the temple 14 is swung outwardly from the frame 16, on the pivot axis 30, the second pivot link changes its rotational orientation relative to the temple (see FIGS. 2 and 4B). In the position of FIG. 2, wherein the second pivot link 24 is essentially aligned with the temple 14, and essentially on a line from the temple 14 to the temple pivot 30, the shuttle is pushed out to its maximum spacing away from the hinge fitting 18. Such maximum shuttle position maximizes the angular separation between the clip lever 20 and the temple 14. This is because of movement of the first pivot link 22 to its largest angle relative to the clip lever 20. This angle may be, for example, about 15° to 25° in preferred embodiments. Other angles are acceptable as long as the clip lever 20 is spaced away from the temple 14 sufficiently to insert the edge of a piece of fabric or other material between the two.

In the closed position of FIG. 1, the movement of the temple has caused the shuttle 26 to move to its position closest to the hinge fitting 18, due to the pivot link 24 and the position of the pivot link axis 28 on the hinge fitting. This quickly draws the clip lever 20 alongside the temple 14 under the influence of the first pivot link 22 and its relatively small angle with the clip lever 20. The first pivot link is connected to the clip lever at a pivot point 34.

Figure 4A:
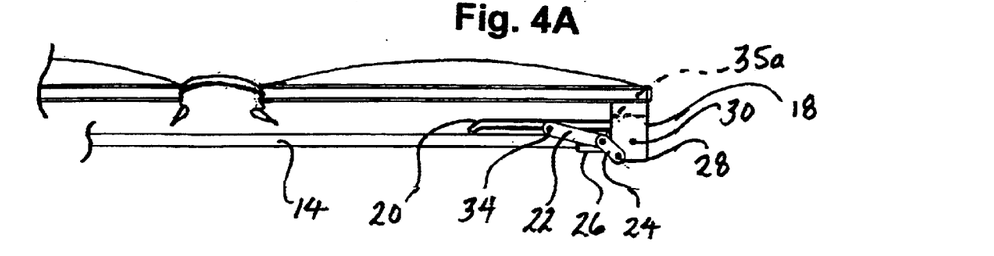
FIGS. 4A, 4B and 4C show in plan view the three positions of the mechanism shown in FIGS. 1–3.
Figure 4B:
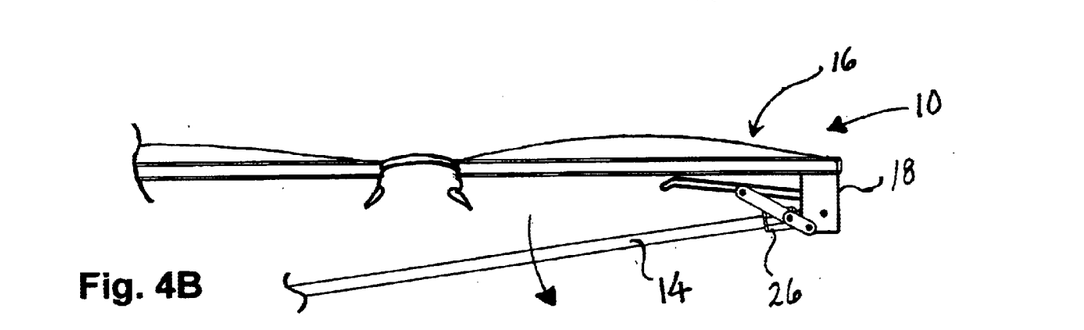

In a preferred embodiment of this mechanism, an over-center feature is included whereby, when the temple is fully closed, it must be closed with a slight degree of force with an over-center function which holds the temple closed and the clip lever 20 against the temple until the temple is deliberately opened with slight force. This is preferably achieved with a bump 35 or 35a shown in FIGS. 4C and 4A. The bump 35 is shown formed on the clip lever 20, near its pivoted end, to engage with a wall 36 shown in dashed lines in FIG. 4C in the hinge fitting. This wall is also shown in dashed lines in FIG. 4A. When the temple is nearly closed, the clip lever 20 folds down toward the eyeglass frame 16 and its movement is interfered with by the nub or bump 35 engaging against the wall 36. When the temple is forced closed, the bump 35 squeezes along the wall 36 until the temple snaps to the closed position, with the clip lever 20 snapped closely against the temple 14 as shown in FIG. 4A. Thus, as explained above, the eyeglasses are clipped securely to an edge of clothing or other material and will remain there even if the person leans over or engages in motions which would otherwise dislodge the glasses. When the temple is pulled open, as in FIG. 4B, the over-center effect is reversed, and a deliberate (but not strong) force is required to snap the temple and clip lever open to the intermediate position.

Figure 3:
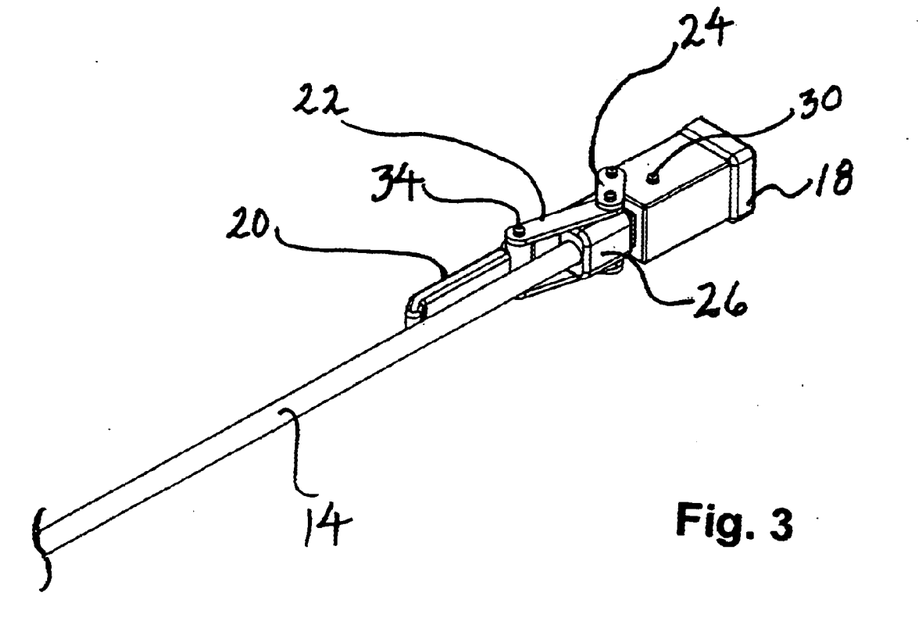
FIG. 3 is a perspective view showing a portion of the apparatus of FIG. 1, with the temple fully opened.
Figure 4C:
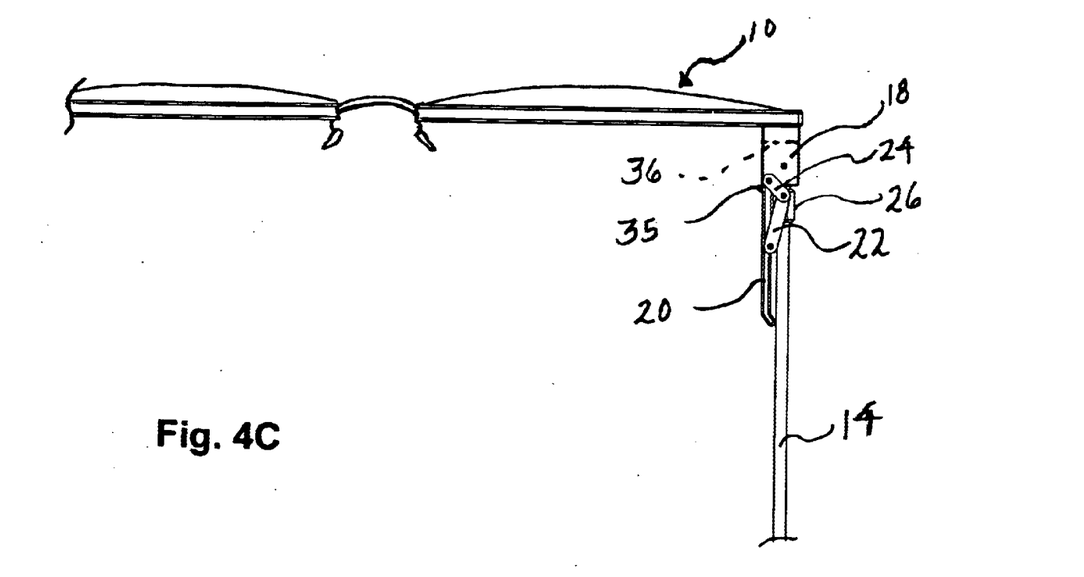
Figure 5:
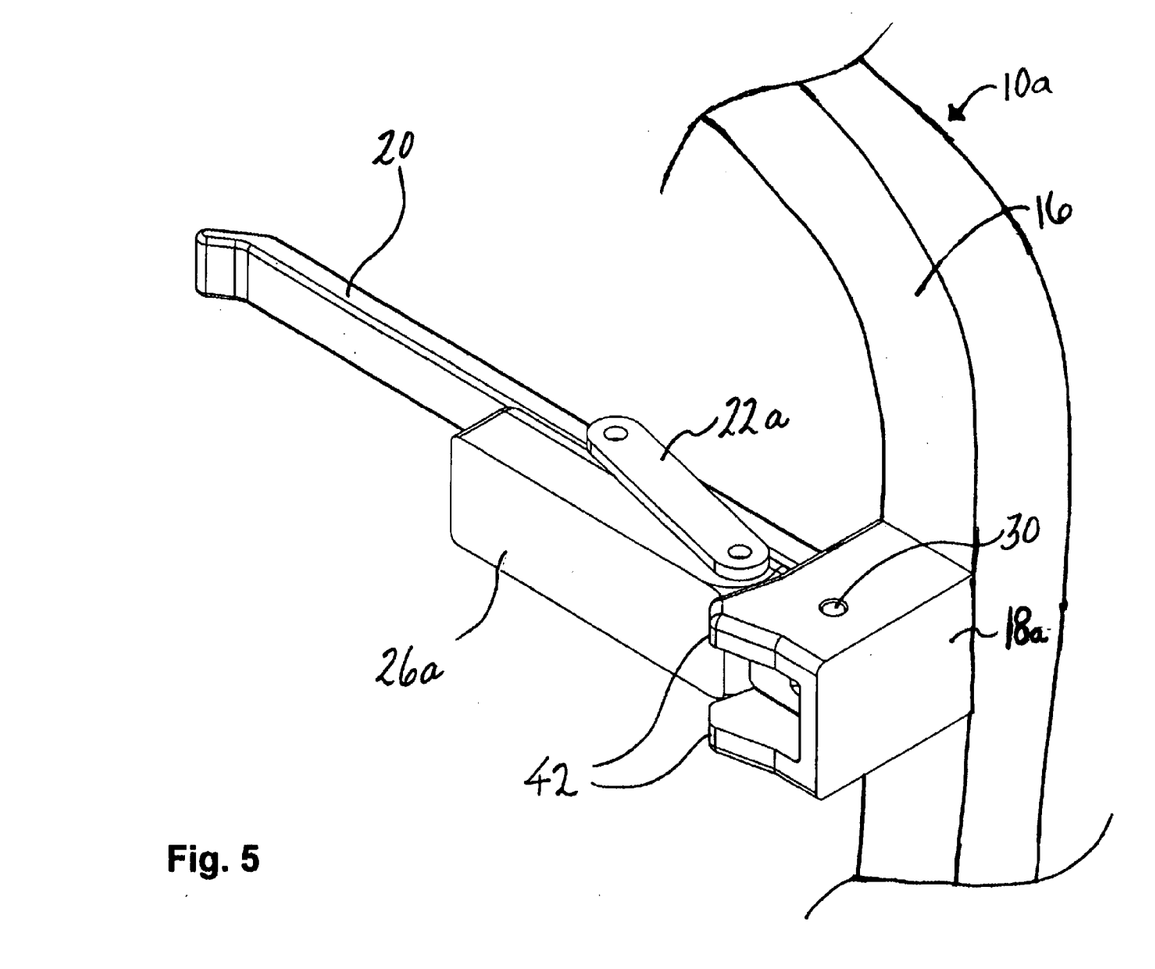
FIGS. 5–8 are perspective views showing a different mechanism for eyeglasses, with a function similar to the mechanism shown FIGS. 1–4C.
Figure 6:
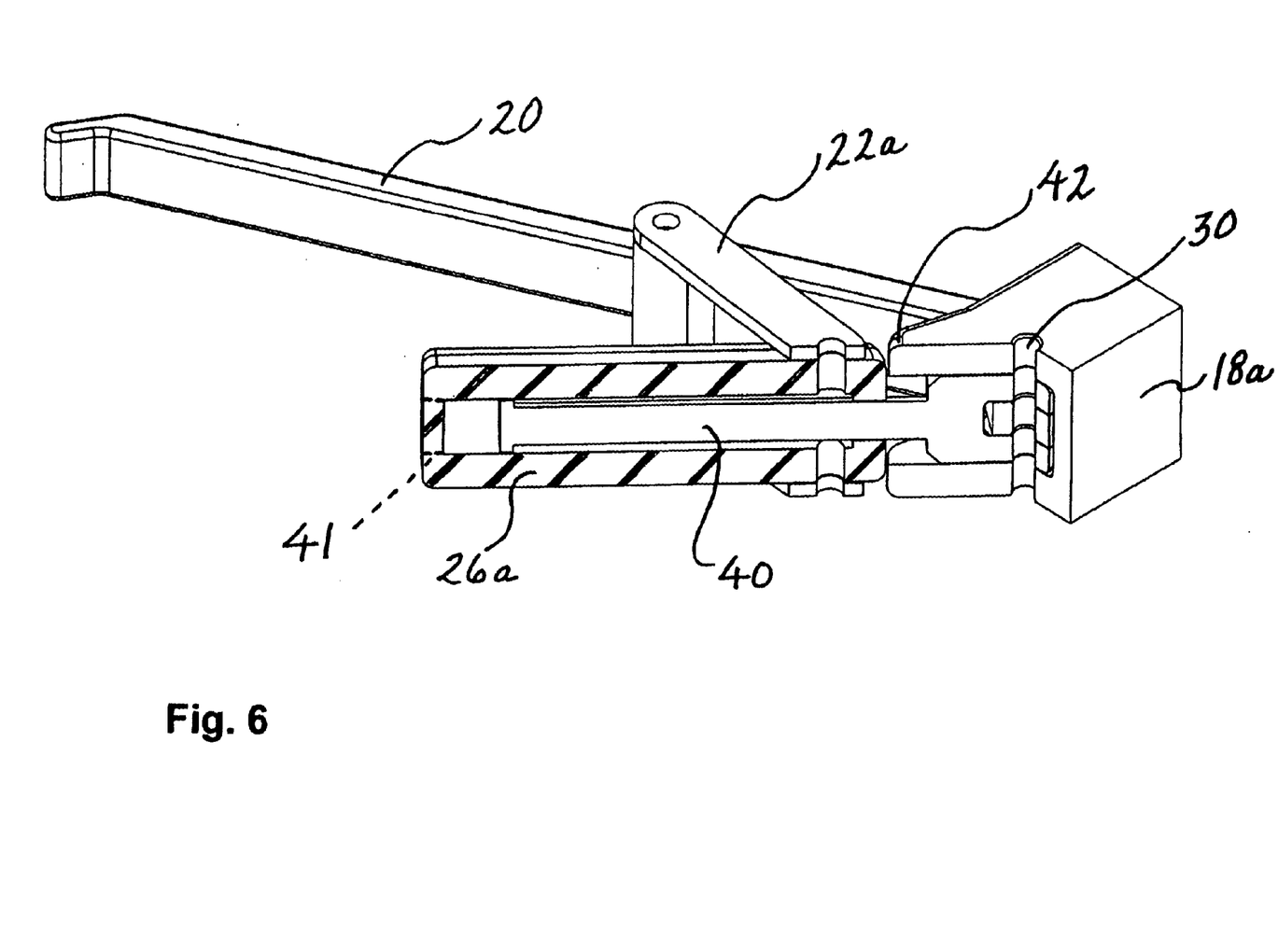
Figure 7:
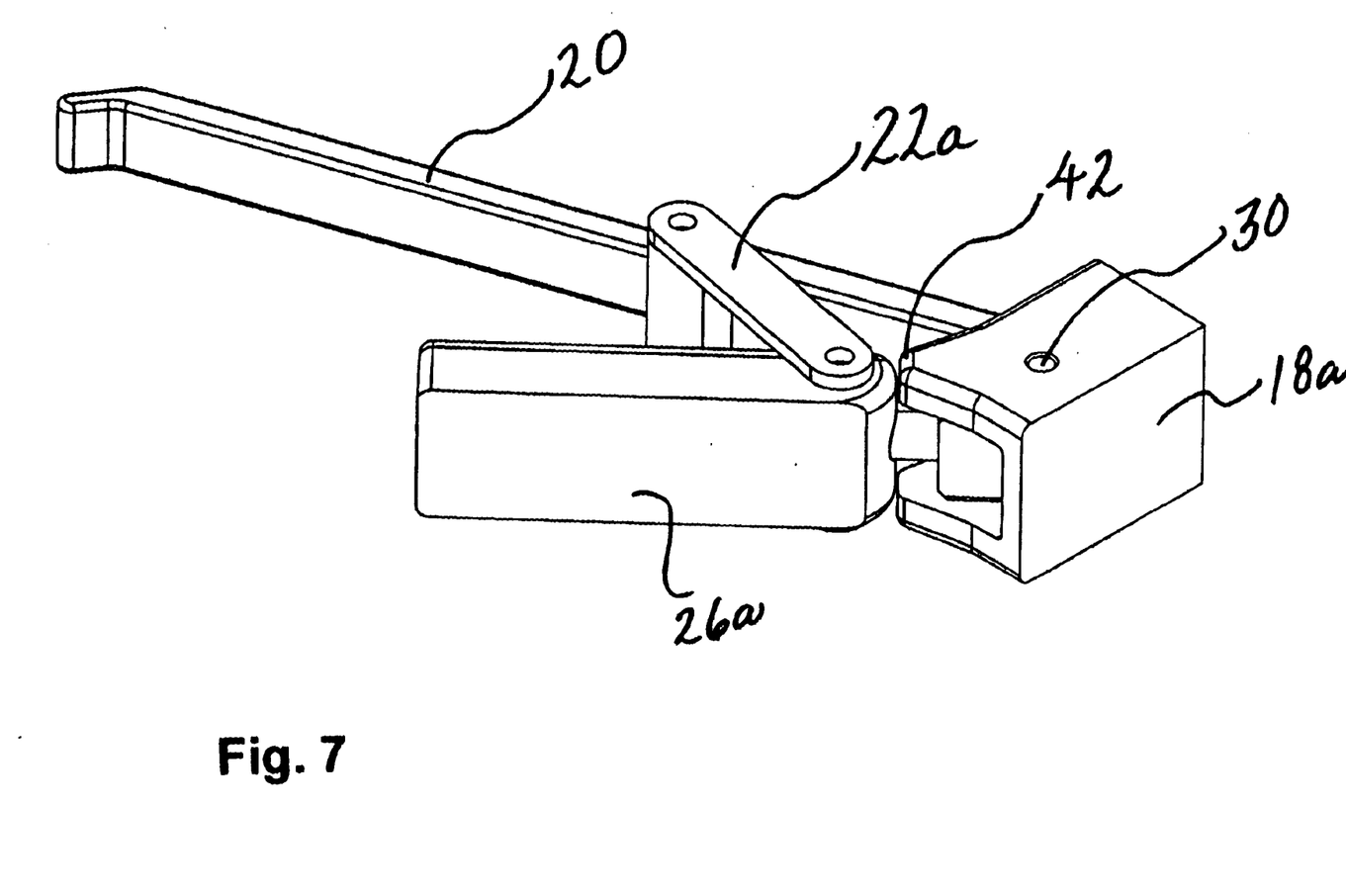
Figure 8:
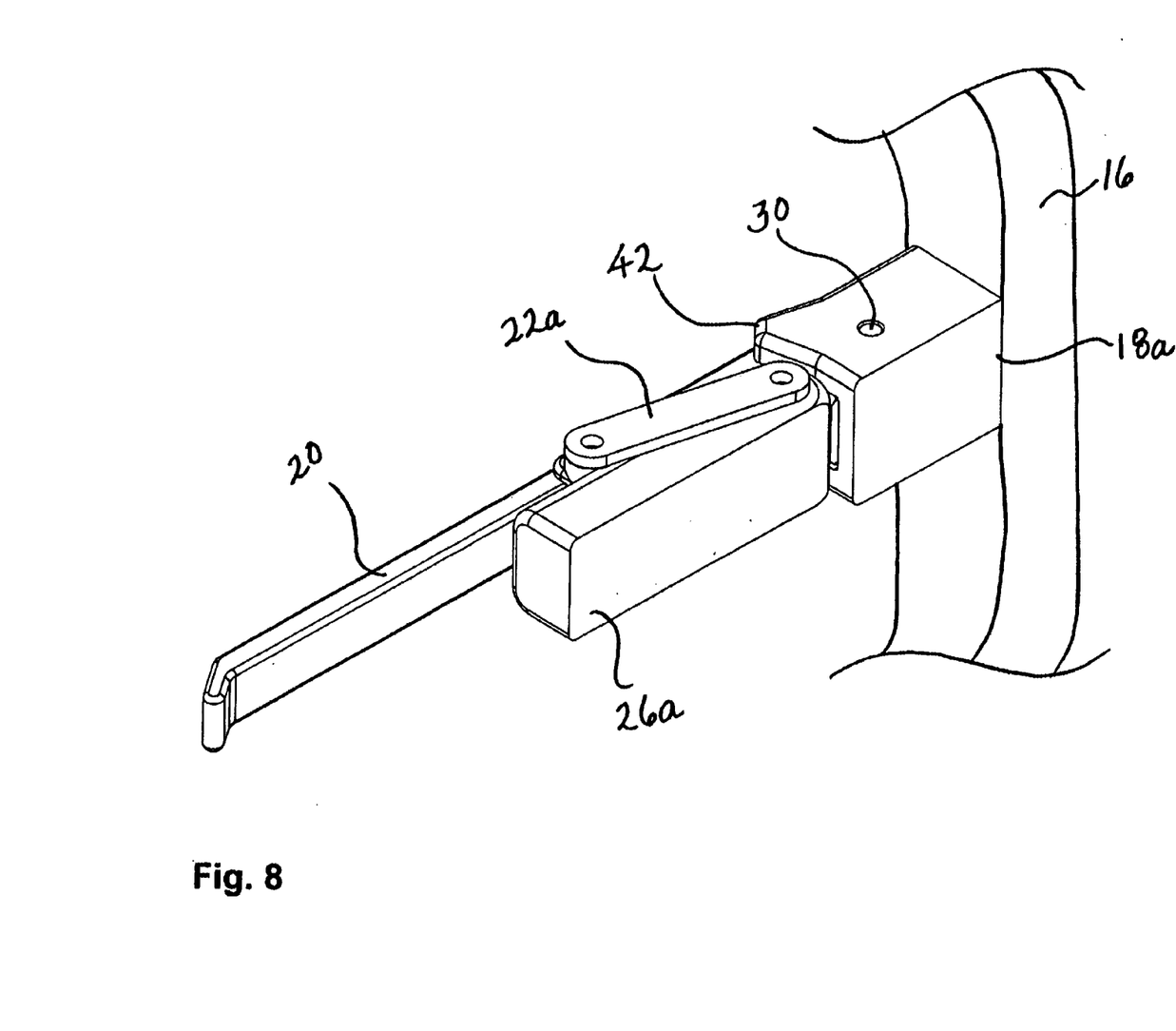

An shown in FIGS. 3 and 4C, when the temple 14 is swung out toward the fully opened position, the clip lever 20 again moves quickly toward the temple in the last few degrees of rotation of the temple. Again, the shuttle 26 has moved fully adjacent to the hinge fitting 18, and this acts on the clip lever with a small angle existing between the clip lever and the first pivot link 22, since the elbow defined by the two pivot links 20 and 24 has been bent to the reverse configuration and the last bit of sliding motion of the shuttle 26 moves the clip lever toward the temple more and more quickly as the angle becomes smaller between the first pivot link 22 and the clip lever 20. This nests the clip lever closely alongside the temple 14 so as to be unobtrusive when the glasses are worn.

Another embodiment is shown in FIGS. 5–11. Again a clip lever 20 engages alongside a temple, of the pair of eyeglasses 10a, with the shuttle 26a positioned to slide in and out with respect to the hinge fitting 18a and the pivot axis 30 of the temple and of the clip lever 20. It is important to note in this embodiment that the shuttle 26a can be a part of or directly affixed to the temple itself, the temple not being shown in these drawings; or, it can simply be a slidable member which slides on the temple. Thus, in the cutaway view of FIG. 6, the shuttle 26a is shown as being slidable on a swingable slide support member 40 which is pivoted along the temple/clip lever pivot axis 30. This member 40 could be the temple itself, if it were extended out to the left in FIG. 6 through the end of the shuttle 26a (through hole shown in dotted lines at 41); or the shuttle 26a can comprise the inner end of the temple, the remainder of the temple not being shown.

Figure 9:
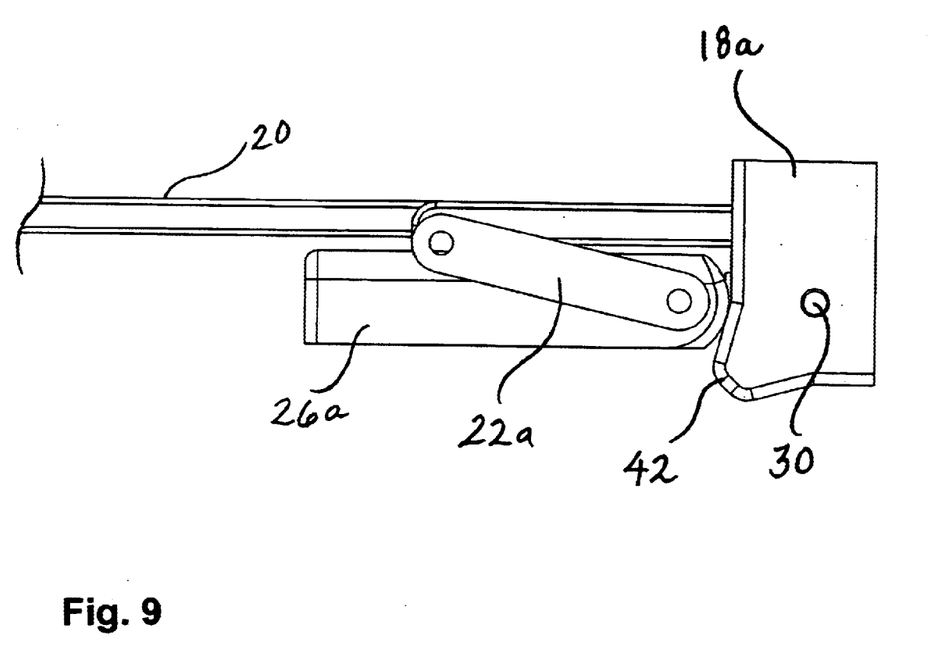
FIGS. 9–11 are plan views showing the mechanism of FIGS. 5–8, in different positions.
Figure 10:
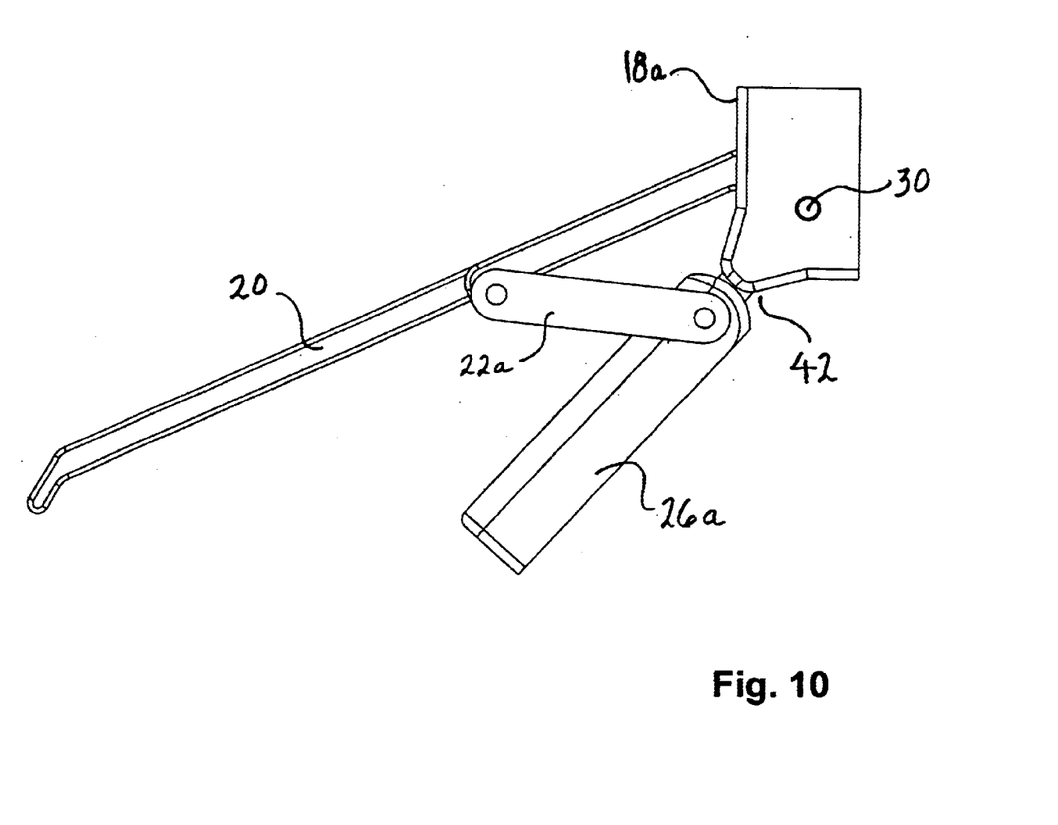
Figure 11:
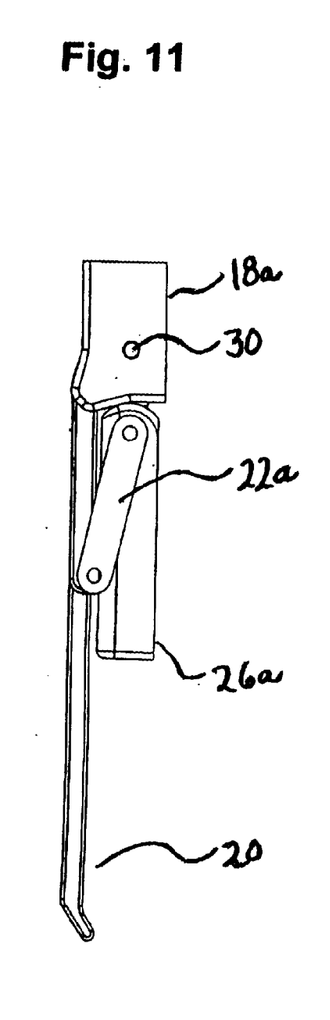

This embodiment works on a cam principle. The shuttle 26a is spring biased toward the hinge fitting 18A (spring not shown, but could be coiled around member 40 and engaging with temple/shuttle 26a interior). The hinge fitting 18a has a cam surface, shown as two parallel cam surfaces 42, which pushes the shuttle away from the pivot axis 30 when the temple is swung between the closed and opened positions. This eliminates the need for a second pivot link 24 as in FIGS. 1–4C, which had the purpose of moving the shuttle in and out in sliding relation to the temple during pivoting of the temple. In FIGS. 5–11, the cam surface 42 provides a protrusion that pushes the shuttle 26a outwardly when the temple is swung from the closed position to an intermediate position, or from the fully opened position (FIG. 8) to an intermediate position. The spring biasing keeps the shuttle 26a against the surface of the hinge fitting 18a, as best seen in FIGS. 9, 10 and 11.

The shuttle is pivotally connected to a pivot link 22a, which in turn is pivotally connected to the clip lever 20, just as in the first embodiment. The pivot lever 22a acts the same as in the first embodiment, in causing the clip lever to rapidly pull toward the temple as the temple reaches a fully opened position and also as the temple reaches a fully closed position. Only the mechanism by which the shuttle is moved in/out is different in this embodiment, as compared to FIGS. 1–4C. Again, an over-center device is preferably included for closing, and thus can work as described above relative to FIGS. 1–4C.

Figures 12, 13, 14:
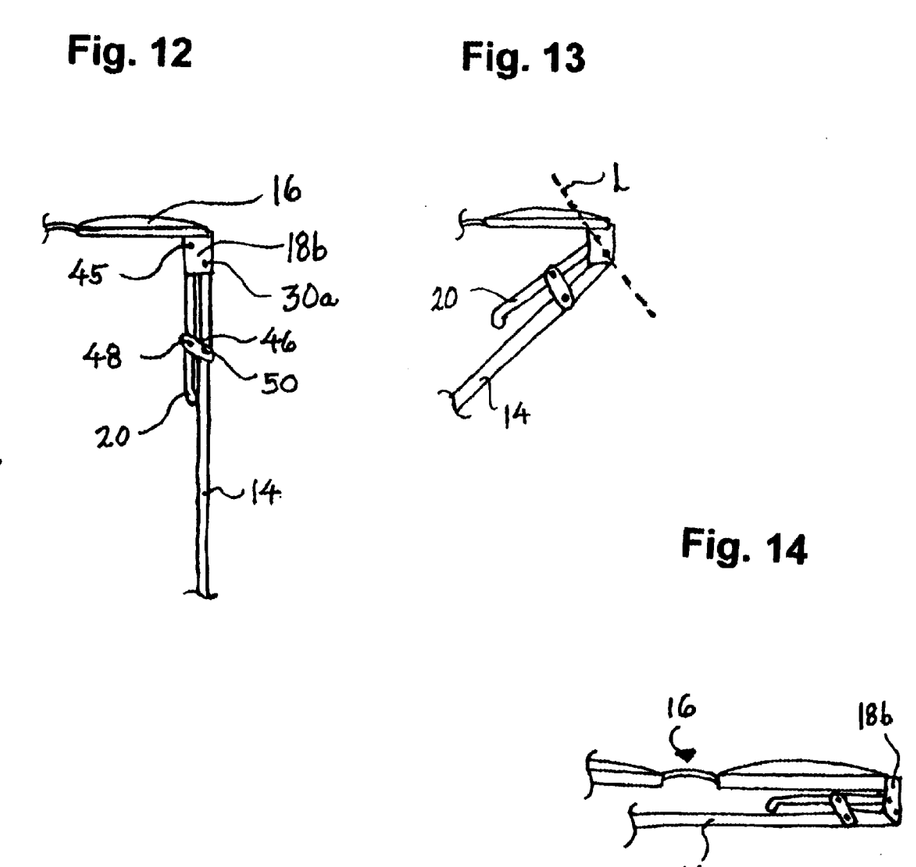
FIGS. 12–14 are plan views showing different positions of another embodiment.

FIGS. 12, 13 and 14 show a simpler form of mechanism wherein a clip lever 20 is secured to a hinge fitting 18b at an axis 45 which is separate and spaced a short distance away from the pivot axis 30a of the temple 14. The two pivot axes 45 and 30a are in an oblique relationship relative to the lens frame 16, and relative the temple 14 when fully opened, as shown particularly in FIGS. 12–14. Here, a single connector link 46 is pivotally connected to each of the clip lever 20 (at a pivot point 48), and the temple 14 (at a pivot point 50). Theoretically the length of the connector link 46 between its pivot points should be about the same as the length between the clip lever and temple pivot axes 45 and 30a, so that the temple can fully open and close properly. The clip lever 20 opens a short distance when in intermediate positions, as in FIG. 13, and the connector link 46 will essentially reverse its orientation between the clip lever and temple when the temple is fully closed as in FIG. 14. Thus, theoretically the connector link 46 remains essentially parallel to the oblique line L passing through the two pivot axes 45 and 30a. An over-center feature, involving mechanical interference as described relative to FIGS. 1–4A, can be included. For example, the clip lever 20 can have an extending and beyond the pivot point 45 in the hinge fitting, positioned to engage against a wall and snap past an interference area, providing a function similar to that described above.

In all embodiments the clip lever and the temple are "essentially pivotally connected" to the hinge fitting, as described in the claims. This term includes variations of a true pivot (e.g. sliding in a slot while swinging, or more complex swinging/pivoting motions). Also, it should be understood that many other mechanisms can be used, so long as the clip lever and the temple (or slide support member) are essentially pivoted from generally the same region and a mechanical linkage causes the opening/closing of the clip lever as described.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. In a pair of eyeglasses including lenses, a lens holding frame, and a pair of temples connected by pivoted connections at hinge fittings at left and right ends of the lens holding frame, the improvement comprising:

a clip lever pivotally connected to the hinge fitting at one side of the lens holding frame and positioned to lie closely adjacent to the temple at said one side when the temple is fully opened and also when the temple is fully closed, and linkage means responsive to pivotal movement of the temple between the opened position for wearing of the eyeglasses and the closed position folded generally adjacent to the lens holding frame, for holding the clip lever closely adjacent to and substantially against the inner side of the temple in both the opened and closed positions of the temple, and for holding the clip lever spaced angularly away from the temple, sufficiently to engage an edge of clothing or other material between the temple and the clip lever, in a position of the temple between opened and closed, whereby, when the temple is closed an edge of clothing or other material can be securely engaged between the clip lever and the temple to firmly hold the eyeglasses in place on the clothing or other material.

2. The eyeglasses of claim 1, wherein the linkage means comprises the temple and the clip lever at said one side being pivoted to the hinge fitting at separate spaced pivot axes, the two pivot axes being positioned such that a perpendicular line passing through the two axes is obliquely angled relative to the lens holding frame, the temple pivot axis being positioned back from and outwardly from the clip lever pivot axis, and including a connector link pivotally secured to the clip lever and to the temple on link pivot axes which are generally parallel to the clip lever and temple pivot axes, the connector link being spaced away from the hinge fitting and the link pivot axes being so arranged as to cause the clip lever to swing substantially against the temple in the opened and closed positions of the temple, but to swing the clip lever away from the temple in intermediate positions of the temple, between opened and closed.

3. The eyeglasses of claim 1, further including over-center means for providing a mechanical interference to fully closing the temple such that once the temple is closed past the interference, the temple snaps to fully closed position with the clip lever held against the temple, thereby gripping the edge of clothing or other material firmly until the temple is deliberately opened.

4. The eyeglasses of claim 1, wherein the linkage means includes a shuttle slidable along the temple toward and away from the hinge fitting, the shuttle being caused to slide by a first pivot link connected to the shuttle and to the hinge fitting that draws the shuttle to slide toward the hinge fitting as the temple approaches fully opened position and as the temple approaches closed position and extends the shuttle away from the hinge fitting in intermediate positions, and the shuttle being connected to the clip lever by a second pivot link which, due to the sliding motion of the shuttle, draws the clip lever toward the temple as the temple approaches and reaches the closed position and also as the temple reaches the opened position, while swinging the clip lever away from the temple in intermediate positions of the temple.

5. The eyeglasses of claim 4, wherein the linkage means includes two said first pivot links and two said second pivot links, one of each at positions above and below the shuttle.

6. The eyeglasses of claim 4, further including over-center means for providing a mechanical interference to fully closing the temple such that once the temple is closed past the interference, the temple snaps to fully closed position with the clip lever held against the temple, thereby gripping the edge of clothing or other material firmly until the temple is deliberately opened.

7. The eyeglasses of claim 6, wherein the over-center means comprises a nub or bump positioned on the clip lever or on the hinge fitting near the pivot of the clip lever, to cause an interfering tightness against full closing of the temple on the frame, which is overcome by a deliberate force in fully closing the temple, effective to force the temple and clip lever over-center past the interference and to snap the temple closed and hold the clip lever adjacent to the temple.

8. The eyeglasses of claim 1, wherein the linkage means includes a shuttle slidable along the temple toward and away from the hinge fitting, the shuttle being spring biased to slide toward the hinge fitting, and the hinge fitting having a cam surface positioned to engage with an end of the shuttle to cam the shuttle to slide away from the hinge fitting as the temple swings through intermediate positions between opened and closed while allowing the shuttle to slide toward and adjacent to the hinge fitting as the temple approaches closed position, and the shuttle being connected to the clip lever by a shuttle pivot link which, due to the sliding motion of the shuttle, draws the clip lever toward the temple as the temple reaches the closed position and also as the temple reaches the opened position, while swinging the clip lever away from the temple in intermediate positions.

9. The eyeglasses of claim 1, wherein the linkage means includes the temple, the temple being slidable as a shuttle toward and away from the hinge fitting, and including a slide support member on which the temple is slidable, the slide support member being pivoted at the hinge fitting, the temple being spring biased to slide toward the hinge fitting, and the hinge fitting having a cam surface positioned to engage with an end of the temple to cam the temple to slide away from the hinge fitting as the temple swings through intermediate positions between opened and closed while allowing the temple to slide toward and adjacent to the hinge fitting as the temple approaches closed position, and the temple being connected to the clip lever by a shuttle pivot link which, due to the sliding motion of the temple, draws the clip lever toward the temple as the temple reaches the closed position and also as the temple reaches the opened position, while swinging the clip lever away from the temple in intermediate positions.

10. The eyeglasses of claim 9, further including over-center means for providing a mechanical interference to fully closing the temple such that once the temple is closed past the interference, the temple snaps to fully closed position with the clip lever held against the temple, thereby gripping the edge of clothing or other material firmly until the temple is deliberately opened.

11. The eyeglasses of claim 10, wherein the over-center means comprises a nub or bump positioned on the clip lever or on the hinge fitting near the pivot of the clip lever, to cause an interfering tightness against full closing of the temple on the frame, which is overcome by a deliberate force in fully closing the temple, effective to force the temple and clip lever over-center past the interference and to snap the temple closed and hold the clip lever adjacent to the temple.

* * * * *